(12) United States Patent
Schmidtke

(10) Patent No.: US 10,365,354 B2
(45) Date of Patent: Jul. 30, 2019

(54) MULTI-TARGET LASER DISTANCE METER

(71) Applicant: Robert Bosch GmbH, Stuttgart (DE)

(72) Inventor: Bernd Schmidtke, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 298 days.

(21) Appl. No.: 15/310,653

(22) PCT Filed: Mar. 13, 2015

(86) PCT No.: PCT/EP2015/055328
§ 371 (c)(1),
(2) Date: Nov. 11, 2016

(87) PCT Pub. No.: WO2015/172911
PCT Pub. Date: Nov. 19, 2015

(65) Prior Publication Data
US 2017/0074975 A1    Mar. 16, 2017

(30) Foreign Application Priority Data
May 16, 2014   (DE) .......................... 10 2014 209 375

(51) Int. Cl.
*G01S 7/00* (2006.01)
*G01S 7/486* (2006.01)
(Continued)

(52) U.S. Cl.
CPC .......... *G01S 7/4865* (2013.01); *G01S 7/4915* (2013.01); *G01S 17/10* (2013.01); *G01S 17/32* (2013.01)

(58) Field of Classification Search
None
See application file for complete search history.

(56) References Cited

U.S. PATENT DOCUMENTS

2006/0119833 A1*  6/2006  Hinderling ............... G01C 3/08
                                                               356/5.11
2007/0018949 A1    1/2007  Chang et al.
(Continued)

FOREIGN PATENT DOCUMENTS

CN        1751222 A      3/2006
CN        1825138 A      8/2006
(Continued)

OTHER PUBLICATIONS

International Search Report corresponding to PCT Application No. PCT/EP2015/055328, dated Jun. 3, 2015 (German and English language document) (7 pages).
(Continued)

*Primary Examiner* — Hovhannes Baghdasaryan
(74) *Attorney, Agent, or Firm* — Maginot, Moore & Beck LLP

(57) ABSTRACT

A laser distance meter includes a laser light source configured to emit temporally modulated laser light toward target objects. The laser distance meter further includes a light detector configured to detect laser light reflected by target objects. The laser distance meter further includes a light detector configured to detect laser light reflects by target objects. The laser distance meter also includes an electronic control and analyzing unit configured to control the laser light source and configured to analyze signals of the light detector. The electronic control and analyzing unit is designed to drive the laser light source, detect laser light reflected by target object by directly synchronously sampling a reception signal over a measurement time duration, generating a detection signal for each modulation frequencies, carry out an inverse Fourier transformation of the detection signal, and evaluate the propagation time spectrum.

15 Claims, 2 Drawing Sheets

(51) Int. Cl.
  *G01S 17/32*  (2006.01)
  *G01S 7/491*  (2006.01)
  *G01S 17/10*  (2006.01)

(56) References Cited

U.S. PATENT DOCUMENTS

| | | | |
|---|---|---|---|
| 2013/0293681 A1* | 11/2013 | Borowski | G01S 7/483 348/46 |
| 2015/0087976 A1* | 3/2015 | Fan | A61B 8/485 600/438 |

FOREIGN PATENT DOCUMENTS

| | | |
|---|---|---|
| CN | 104024878 A | 8/2016 |
| DE | 101 12 833 C1 | 3/2003 |
| DE | 10 2009 029 372 A1 | 3/2011 |
| DE | 10 2011 076 491 A1 | 11/2012 |
| DE | 10 2011 076 493 A1 | 11/2012 |
| EP | 0 676 649 A1 | 10/1995 |
| EP | 1 450 128 A1 | 8/2004 |
| EP | 1 757 956 A1 | 2/2007 |
| JP | 2008-107286 A | 5/2008 |
| WO | 94/18549 A1 | 8/1994 |

OTHER PUBLICATIONS

Sai et al.; Advanced High Precision Radar Gauge for Industrial Applications; Radar 2006: Proceedings of 2006 CIE International Conference on Radar; Oct. 16-19, 2006; pp. 463-466; vol. 1; IEEE Operations Center, Piscataway, NJ, USA.

* cited by examiner

MULTI-TARGET LASER DISTANCE METER

This application is a 35 U.S.C. § 371 National Stage Application of PCT/EP2015/055328, filed on Mar. 13, 2015, which claims the benefit of priority to Serial No. DE 10 2014 209 375.9, filed on May 16, 2014 in Germany, the disclosures of which are incorporated herein by reference in their entirety.

BACKROUND

The present disclosure relates to a laser distance meter for ascertaining a distance to at least one target object. Furthermore, the disclosure relates to a method for operating a laser distance meter, and to a computer program product adapted therefor, and a computer-readable medium.

Laser distance meters are used for example to be able to determine a distance between the laser distance meter and a target object simply, rapidly and precisely. For this purpose, the laser distance meter transmits light toward the target object. The light is temporally modulated with regard to its intensity, for example. Part of said light is reflected from the target object back to the laser distance meter and can be detected there by a light detector. A propagation time required by the light to pass to the target object and back again to the laser distance meter leads to a phase shift between emitted and detected light. By suitably measuring said phase shift, it is therefore possible to ascertain the propagation time and, on the basis of the known speed of light, thus to deduce the distance between the target object and the laser distance meter.

Conventional laser distance meters are usually based on the concept of so-called mixing, in particular heterodyne mixing. The term "mixing" can be understood to mean a multiplication of a temporally oscillating measurement signal by a likewise temporally oscillating reference signal in order to generate an output signal. In the case of "homodyne mixing" the measurement signal is mixed with a reference signal of identical frequency. In the case of "heterodyne mixing" the measurement signal is mixed with a reference signal of different frequency, wherein the frequency difference is typically small relative to the frequency of the measurement signal.

The use of the concept of mixing may be used to generate an output signal that oscillates with a significantly lower frequency than the measurement signal, with a maintenance of the phase shift with regard to the high modulation frequency. The low-frequency output signal can therefore be detected and electronically analyzed significantly more simply without loss of accuracy. However, on account of low-pass filtering with mixing of measurement signal and reference signal it may be necessary, before evaluating the output signal, to wait for a certain time until the mixed output signal has settled and stabilized.

On account of a $2\pi$ periodicity of the phase analysis it is generally necessary to use a plurality of modulation frequencies to solve the unambiguity problem associated therewith. Unambiguity problems occur for distances greater than the modulation wavelength. With the aid of phase differences with respect to a plurality of different modulation frequencies, the distance of a more distant target can be unambiguously deduced by means of a mathematical development algorithm and suitable choice of the number of frequencies and the frequencies.

Furthermore, unambiguity problems may also occur as a result of the fact that there are significant reflections at targets having different distances in the measurement signal, that is to say that multiple reflections occur. For the case of a few specific additional reflections having a known distance, which can for example also be used for referencing purposes, restrictions arise mathematically with regard to the selection and minimum number of the modulation frequencies used.

On account of the finite settling time of the low-pass filtering, an optimum arises for the number of modulation frequencies used. Said optimum generally represents a compromise between the robustness of the development algorithm with respect to multiple reflections and the measurement time.

Conventional laser distance meters are described for example in DE 10 2011 076 491, DE 10 2011 076 493 and DE 10 112 833.

In recent laser distance meters, very fast light detectors and electronics can be used in order to be able to directly synchronously sample a measurement signal based on modulated laser light. In this case, the term "directly synchronous sampling" ("direct synchronous detection") can be understood to mean a temporal sampling of a modulated reception signal, wherein the sampling is effected at the same frequency as the modulation of the emitted signal. The sampling is synchronized with the modulation. No mixing with a reference signal takes place in the case of direct synchronous sampling. In this case, the reception signal typically has a damping and a propagation time delay with respect to the transmission signal.

Laser distance meters based on direct synchronous sampling are described for example in US 2007/0182949 A1 and DE 10 2009 029 372.

The conventional laser distance meters described in the introduction regularly have problems, however, in simultaneously determining distances to a plurality of target objects. The problems are aggravated particularly if multiple targets with variable distances are involved. In other words, they generally lack a multi-target capability. By way of example, malfunctions typically occur if a distance to a target object is intended to be determined using a laser distance meter and a pane of glass, for example, is situated between the laser distance meter and the target object, said pane of glass partly reflecting the emitted laser light back to the laser distance meter in just the same way as the target object. This additional back-reflection regularly gives rise to an incorrect interpretation of the detected laser radiation reflected back and thus to incorrect distance indications.

SUMMARY

Embodiments of the present disclosure make possible, inter alia, a laser distance meter and a method for operating a laser distance meter in which a general multi-target capability can be achieved simply, cost-effectively and/or with short measurement durations or in which distance measurements are possible reliably and accurately even in the case of disturbance influences by additional target objects.

In accordance with a first aspect of the disclosure, a laser distance meter is proposed, comprising a laser light source, a light detector and an electronic control and analyzing unit. The laser light source is adapted for emitting temporally modulated laser light toward target objects. The light detector is adapted for detecting laser light reflected by target objects and is designed, in particular, to directly synchronously sample laser light modulated with frequencies in the range of 10 MHz to 5 GHz, preferably 100 MHz to 1.5 GHz. The electronic control and analyzing unit is adapted for controlling the laser light source and for analyzing signals of the light detector. The laser distance meter is distinguished by the fact that the electronic control and analyzing unit is designed to perform the following method steps:

driving the laser light source in order to emit temporally modulated laser light successively at a multiplicity M of at least 20, preferably at least 100, discretely different modulation frequencies $f_m$ (m=1 ... M), and detecting laser light reflected by target objects by directly synchronously sampling over a measurement time duration $\Delta t$ and generating a detection signal $I_m$ for each of the modulation frequencies $f_m$;

carrying out an inverse Fourier transformation of the detection signal $I_m$ in order to generate a propagation time spectrum $L_m$;

evaluating the propagation time spectrum $L_m$ in order to ascertain at least one distance between the laser distance meter and at least one of the target objects. The indicated method steps can, but need not necessarily, be carried out in the indicated order.

Embodiments of the present disclosure may be regarded inter alia as being based on the insights and concepts described below:

As described in the introduction, many conventional laser distance meters are based on the concept of mixing measurement and reference signals, in order not to have to place high demands inter alia on the speed of the light detector and the electronics. In the case of such laser distance meters, however, it is generally prohibited to emit modulated laser light as measurement signal at a multiplicity of discrete frequencies, since it is necessary to wait for a settling time to elapse after each change of the modulation frequency, and a total measurement duration may therefore become unacceptably long. In order to be able to measure distances to a plurality of target objects simultaneously, it appears to be necessary, however, to measure propagation-time-dictated phase shifts at a plurality of modulation frequencies, and so a multi-target capability appeared not to be possible or to be associated with unacceptably long measurement durations in the case of such conventional laser distance meters.

EP 1 757 956 A1 describes a multi-target distance measuring method in which a calculation of distances is based on a solution to a statistical parameter estimation problem. This method has restrictions with regard to the maximum number of distinguishable targets and is motivated by the desire to minimize a number of modulation frequencies used and is mathematically demanding as a result.

Embodiments of the laser distance meter described herein and of a method for operating such a laser distance meter make possible an unrestricted multi-target capability with short measurement durations and without a use of mathematical algorithms that are complicated and thus costly to implement.

It has now been recognized that, with the aid of modern fast light detectors and electronics which make possible direct synchronous sampling of light reflected back by target objects, a multi-target capability can be achieved by measuring a propagation time delay at very many modulation frequencies and skillfully analyzing the measurement results with the aid of Fourier transformations. It has been recognized as advantageous that, in the case of direct synchronous sampling, the long settling durations that are customary when mixing signals typically do not occur and a total measurement duration can thus be kept short despite the modulation frequency being changed multiply, since no low-pass filtering of the mixed signal is required.

In the case of the proposed laser distance meter and the operating method carried out therein, propagation times required by laser light to pass from a laser distance meter to one or a plurality of target objects and back again may be measured at a multiplicity of modulation frequencies. By way of example, detection signals $I_m$ may be measured at more than 20 (i.e. m=1, ..., M where M>20), preferably more than 100 (M>100) or more preferably at hundreds (e.g. M>500) of different discrete modulation frequencies. An order of the modulation frequencies and/or a frequency spacing between the modulation frequencies may be arbitrary here, wherein, as described further below, an equidistant spacing between adjacent modulation frequencies may be advantageous. The minimum frequency spacing generally limits the maximum distance which can be determined unambiguously. The total tunable frequency range limits the minimum distance at which targets at different locations can be resolved.

In this case, the detection signal $I_m$ may be calculated from a reception signal $P_{n,m}$ e.g. in a preprocessing step. In this case, the reception signal $P_{n,m}$ may be sampled at N points, wherein this temporal sampling is carried out for each of the reception signals detected at the M modulation frequencies.

In one very simple embodiment, a detection signal $I_m$ used for further processing may for example simply directly consist of the first one of the N samples of the reception signal, i.e. $I_m = P_{1,m}$. Furthermore, each of the N samples may additionally be used for improving the signal-to-noise ratio. A possible disadvantage of this simple embodiment may be that higher harmonics in the reception signal on account of a possibly non-sinusoidal pulse shape of the modulated signal may be maintained in the detection signal and have a disturbing effect.

The detection signal $I_m$ may then be transformed back into the time domain in an inverse Fourier transformation and a propagation time spectrum $I_m$ of the transmission signal over the delay path may be obtained as a result. Said propagation time spectrum may finally be analyzed with high accuracy with regard to amplitude and/or phase. With the aid of the speed of light, distances to one or else a plurality of target objects can be ascertained therefrom rapidly and with high precision by analysis of the amplitude and/or the phase.

In accordance with one embodiment, a plurality of distances between the laser distance meter and in each case one of a plurality of the target objects are ascertained when evaluating the propagation time spectrum $L_m$. In other words, a multi-target capability is made possible and used. This makes use of the fact that the propagation time spectrum generated in accordance with the method contains detailed information about the distances of all target objects which reflect parts of the emitted laser light, and said propagation time spectrum can be analyzed simply and precisely.

In accordance with one embodiment, the modulation frequencies $f_m$ are equidistantly spaced. In other words, the difference between two adjacent modulation frequencies is identical for all the modulation frequencies. This may considerably facilitate Fourier transformations or an analysis of the results thereof.

By way of example, in an overall measurement it is possible to vary the modulation frequency within an overall range of 400 MHz to 1000 MHz 601 times with equidistant frequency spacings of 1 MHz.

In accordance with one embodiment, a digital filtering is carried out with regard to the reception signal $P_{n,m}$ in order to calculate the detection signal $I_m$. For this purpose, the detection signals $I_m$ may be calculated as Fourier transformation of the temporally sampled reception signal and the real part and/or the imaginary part of only or at least substantially only the fundamental component of the modulation frequency are used. In other words, the detection signals are filtered with regard to higher-harmonic components by only the portion of the fundamental component being taken into account in the Fourier transformation. The signals filtered in this way are substantially free of spectral contributions of higher harmonics, i.e. free of spectral contributions 2, . . . , N/2, such as may be present in the unfiltered detection signal possibly as a result of a pulse shape of the modulated laser light signals that is not purely sinusoidal. By filtering higher-harmonic components out of the detection signals, it is possible to avoid for example measurement errors and/or ambiguities in measurement results.

In accordance with one embodiment, coarse distance determination is carried out by evaluating the propagation time spectrum with regard to amplitude values. For this purpose, in the propagation time spectrum, for example, positions of maxima or peaks may be determined and an associated distance may in each case be derived therefrom. A separation of reflections of target objects at different distances may also be effected by analyzing amplitudes in the propagation time spectrum. In accordance with one embodiment, a refined distance determination is carried out by evaluating the propagation time spectrum with regard to phase values. For this purpose, for example, a zero crossing of the phase values may be determined. In particular, the zero crossing of the phase values may be determined at points of the propagation time spectrum at which the amplitude values lie in the form of a peak significantly above a noise amplitude. Adjacent support points of the phase values may be developed for example with knowledge of a phase gradient over a propagation time. The measures mentioned may be used individually or in combinations in order to be able to ascertain the distances of one or, in particular, a plurality of target objects very precisely on the basis of the propagation time spectrum.

In accordance with one embodiment, the light detector of the laser distance meter comprises at least one SPAD (Single Photon Avalanche Diode) or an array of SPADs. SPADs can detect modulated intensity variations in received laser light with a very high temporal resolution and are therefore well suited to the implementation of the method described herein. Alternatively, other fast light detectors such as, for example, CMOS/CCD-based detectors (photo gate) may also be used.

The laser distance meter described herein may also be implemented by virtue of the fact that a laser distance meter provided with sufficiently fast components is adapted suitably with regard to its electronic control and analyzing unit in such a way that it carries out the above-described method steps in order in this way to achieve an improved distance determination and/or a multi-target capability.

For this purpose, for example, a laser distance meter provided with a programmable electronic analyzing and control unit may be programmed by means of a suitably adapted computer program product to carry out the method steps mentioned. For this purpose, the computer program product may be stored on a machine-readable medium, such as a CD, DVD or a flash memory, for example, or be made available via the internet. Alternatively, a suitably designed DSP (digital signal processor) may also be implemented.

To summarize, aspects and embodiments of the disclosure and possible features and advantages thereof may be presented as follows:

In previous distance measuring methods based on mixing and phase measurement with different modulation frequencies, measurement is typically carried out only with an expediently selected set of a few specific modulation frequencies, in order to avoid relatively high time losses as a result of typically long settling times. What is disadvantageous in that case is that a multi-target capability cannot be achieved or can only be achieved with considerable mathematical complexity.

Therefore, a further developed laser distance meter and a method for operating the same are proposed. In this case, laser light reflected back is directly synchronously sampled at a fixed modulation frequency within a predefined measurement duration. A digital filter is optionally applied as a preprocessing step for eliminating higher harmonics. Modulation frequencies are varied in discrete steps, preferably in equidistant steps. A spectral analysis of the signal sampled for the discrete modulation frequencies and possibly digitally filtered by the preprocessing step is carried out for determining the propagation time spectrum and thus for the distance measurement of possibly a plurality of targets. This is optionally followed by a phase analysis of the propagation time spectrum by determining a phase zero crossing in order to increase the accuracy. One or a plurality of SPADs may optionally be used as light detectors.

The method described here and a correspondingly configured laser distance meter can extend the simple measuring method of directly synchronous sampling toward a multi-target capability. This is made possible by a use of a multiplicity of modulation frequencies with preferably equidistant spacing and an optional application of a digital filter as a preprocessing step. The application of a digital filter allows a suppression of next-higher harmonics for further signal processing by spectral decomposition, which would otherwise have a disturbing effect.

What can advantageously be achieved by the possible achievement of a multi-target capability for the laser distance meter is that it is possible to carry out a distance measurement to a target object for example through a partly reflective pane of glass. Furthermore, in the context of error detection, the presence of undesired disturbance reflections can be detected. A required measurement duration can be kept short. A collinear optical set-up and hence further advantages can be realized.

A further advantage of the laser distance measuring method with a general multi-target capability as described here is that measurement can be carried out through optically transparent media having different refractive indices. Reflections at the boundary layers and optical path lengths between the boundary layers can be detected. This may be advantageous for example for measurement tasks such as e.g. the determination of filling levels in liquid tanks or the like.

In this case, by way of example, a laser distance meter may be used in such a way that a laser beam emitted by it passes through a medium during a measurement, the refractive index of said medium differing from that of air. On account of the partial reflections that unavoidably occur here at interfaces, it is possible to identify that the laser beam passes through an optically denser medium for example starting from a specific position within the entire path through which radiation is transmitted. Consequently, given a known refractive index there, it is possible for example to deduce a filling level in a store.

It is pointed out that possible features and advantages of embodiments of the disclosure are described herein in part with reference to a laser distance meter and in part with reference to a method for operating the same. A person skilled in the art will recognize that the features can be transferred, exchanged and/or modified in a suitable way in order to arrive at further embodiments of the disclosure and, if appropriate, to be able to realize synergistic effects.

BRIEF DESCRIPTION OF THE DRAWINGS

Embodiments of the disclosure are described below with reference to the accompanying drawings, wherein neither the description nor the drawings should be interpreted as restricting the disclosure.

The figures are merely schematic and not true to scale. Identical reference signs designate identical or similar features in the different figures.

DETAILED DESCRIPTION

Figure 1:
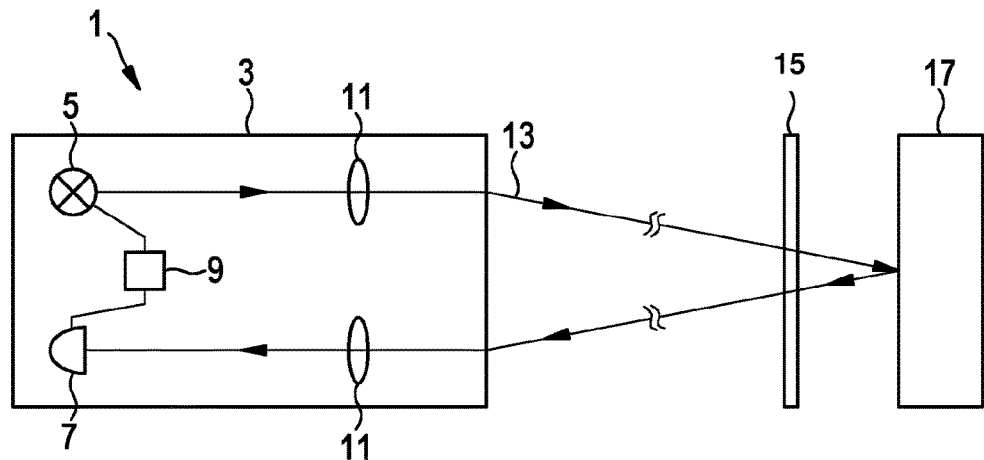
FIG. 1 shows a laser distance meter in accordance with one embodiment of the present disclosure.

FIG. 1 shows a laser distance meter 1 in accordance with one embodiment of the present disclosure. Accommodated in a common housing 3, the laser distance meter 1 comprises a laser light source 5 such as, for example, a laser diode, a light detector 7 such as, for example, a SPAD or an array of SPADs, and an electronic control and analyzing unit 9. The laser distance meter may furthermore comprise one or a plurality of optical units 11 in order to focus a laser light beam 13 emitted by the laser light source 5, to direct it onto one or a plurality of target objects 15, 17 and/or to guide light reflected back onto a detection area of the light detector 7. The laser distance meter 1 may be designed in particular to be small enough and compact enough to be able to be used as a handheld device.

Figure 2:
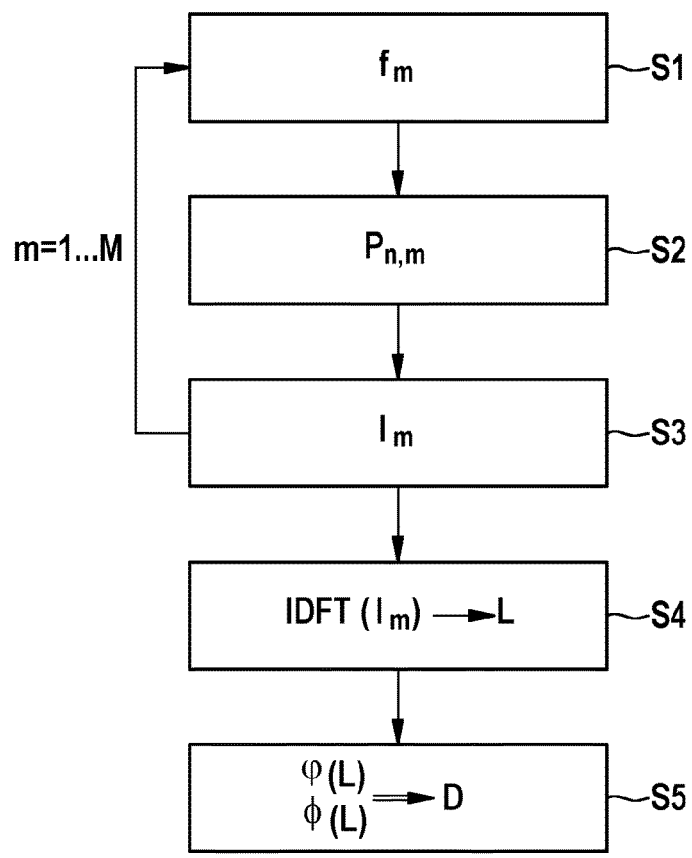
FIG. 2 shows a flow diagram of method steps to be carried out in a laser distance meter according to the disclosure.

A method as to how the laser distance meter 1 can be operated by a suitably adapted electronic control and analyzing unit 9 is described below by way of example. In this case, reference is made to the method sequences and method steps S1 to S5 illustrated as a flow diagram in FIG. 2.

In order to be able to measure a distance between the laser distance meter 1 and the target objects 15, 17, the laser distance meter 1 transmits a transmission signal in the form of a laser light beam 13 emitted by the laser light source 5 toward the target objects 15, 17 and detects light reflected back as a reception signal with the aid of the light detector 7.

In order to be able to determine the propagation time required here by the laser light beam 13, the laser light beam 13 is temporally modulated with regard to its power, for example, typically with a modulation frequency $f_m$ in the range of 100 to 1500 MHz (step S1). Since the reception signal comprises propagation time delays and power attenuations in accordance with the light propagation properties over the delay path, a propagation-time-dictated phase delay between the emitted light and the detected light reflected back can be measured and the distance to the target objects can be ascertained therefrom.

For a given modulation frequency $f_m$, the reception signal P is directly synchronously sampled over a measurement time duration $\Delta t$ (step S2). That means that the sampling is effected directly, i.e. without frequency conversion by mixing, and synchronously with the modulation of the transmission signal, i.e. on the same time basis relative thereto.

The light detector 7 and the electronic control and analyzing unit 9 make possible a certain sampling time interval on account of their technical and/or physical properties. With a temporal resolution $\delta t$ given by said sampling time interval, this results in $N=f_m*\delta t$ samples per modulation period of the transmission signal. The N samples per modulation period are cumulated cyclically over $N_{period}=\Delta t/(N*\delta t)$ modulation periods. In this case, $N_{period}$ is not necessarily an integer. A result $P_{n,m}$ after the measurement time $\Delta t$ thus consists of the N cumulated samples of the reception signal over time for the given modulation frequency $f_m$. In this case, the frequency index n assumes discrete values of 1 to M. The time index n assumes discrete values of 1 to N.

In one very simple embodiment, the detection signal $I_m$ used for further processing for example simply directly consists of the first one of the N samples of the reception signal, i.e. $I_m=P_{1,m}$. Furthermore, each of the N samples may additionally be used for improving the signal-to-noise ratio. A disadvantage of this simple embodiment may be that higher harmonics in the reception signal on account of a non-sinusoidal pulse shape of the modulated signal may be maintained in the detection signal and have a disturbing effect. Advantageously, but optionally, $I_m$ is therefore calculated by applying a digital filter (step S3). The digital filter may be realized in a very simple manner in the context of a discrete Fourier transformation of the N samples in the time domain. A Fourier spectrum for the given modulation frequency $f_m$ consisting of N/2 phase vectors with respect to N temporal samples arises as a result. The detection signal $I_m$ is calculated only from the real part and/or the imaginary part of the phase vector of the fundamental component. The detection signal digitally filtered in this way is to the greatest possible extent free of the spectral contributions $2, \ldots, N/2$ which may be present in the unfiltered signal possibly as a result of a pulse shape of the modulated transmission signal that is not purely sinusoidal.

The process described up to this point is then carried out sequentially successively for M modulation frequencies, wherein the order of the modulation frequencies may be chosen arbitrarily. The result is a detection signal $I_m$ for M discrete modulation frequencies ($m=1, \ldots, M$).

An inverse Fourier transformation $IDFT_m$ of the detection signal via the modulation frequency $I_m$ back into the time domain produces a propagation time spectrum $L_m$ of the transmission signal over the delay path (step S4).

This complex propagation time spectrum $L_m$ can be analyzed in the context of a distance determination D (step S5) both with regard to amplitude and with regard to phase in order to achieve higher accuracy.

Figure 3:
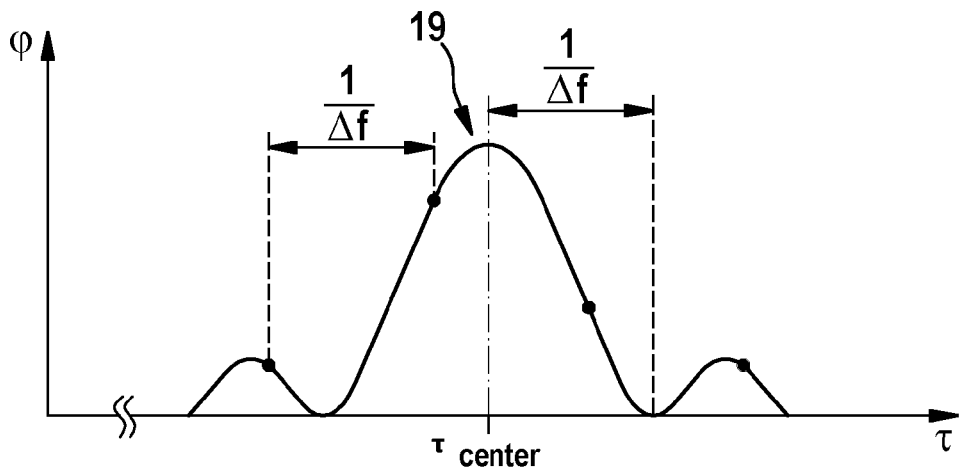
FIG. 3 illustrates an amplitude analysis of a propagation time spectrum recorded by a laser distance meter according to the disclosure.

A course distance determination D and also a separation of reflections of targets at different distances may be carried out by analyzing amplitude values $\rho_m$ of the propagation time spectrum $L_m$. As illustrated in FIG. 3, for example the position of a maximum 19 of the amplitude values may be determined for this purpose. It is also possible in particular to use more complex methods known from signal processing for analyzing the amplitude, e.g. centroid determination or else of envelope fit taking account of the transfer function.

Figure 4:
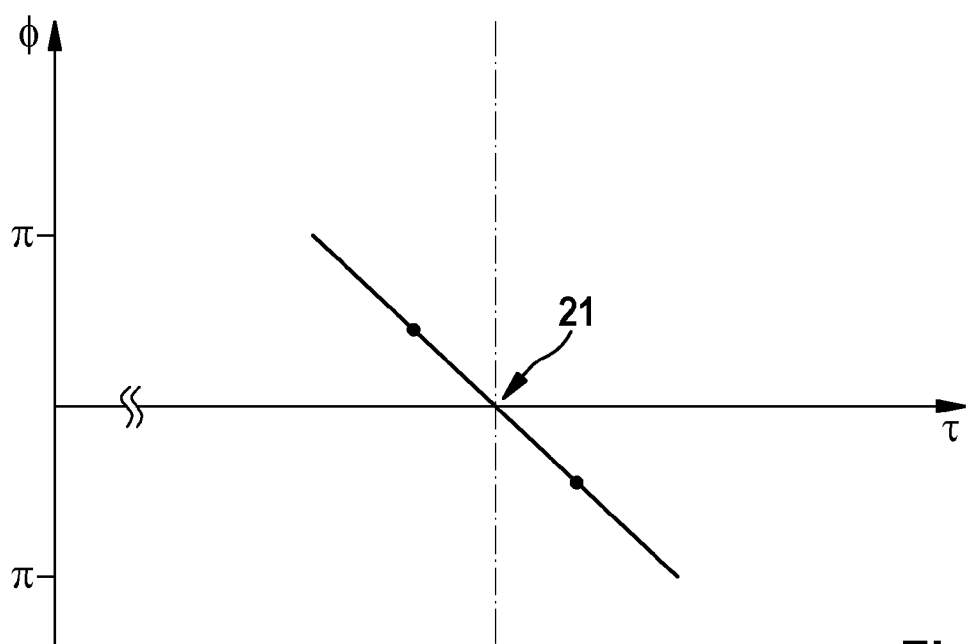
FIG. 4 illustrates a phase analysis of a propagation time spectrum recorded by a laser distance meter according to the disclosure.

A more precise distance determination D may be carried out on the basis of a phase analysis. For this purpose, as illustrated in FIG. 4, it is possible to determine a zero crossing 21 of the phase $\Phi$ at various points at which the amplitude was significantly above a noise amplitude, such that a peak can be identified. Adjacent support points of the phase may be developed with knowledge of the phase gradient over the propagation time. In this case, the phase gradient is given by the centroid of the modulation frequency spectrum $\tau_{center}$ and is thus known ($d\Phi/d\tau=-2\pi*\tau_{center}$ holds true).

By evaluating the propagation time spectrum $L_m$, distances D between the laser distance meter 1 and the plurality of target objects 15, 17 can be ascertained unambiguously and with high accuracy.

The invention claimed is:

1. A laser distance meter comprising:
   a laser light source configured to emit a temporally modulated laser light toward target objects;
   a light detector configured to detect a reflected laser light reflected by the target objects, wherein the light detector is designed to directly synchronously sample the reflected laser light modulated with frequencies in the range of 10 MHz to 5 GHz; and
   an electronic control and analyzing unit configured to control the laser light source and analyze signals of the light detector, wherein the electronic control and analyzing unit is configured to:
   drive the laser light source in order to emit the temporally modulated laser light successively at a multiplicity of at least 20 discretely different modulation frequencies;
   detect the reflected laser light reflected by target objects by directly synchronously sampling a reception signal over a measurement time duration and generating a detection signal for each of the modulation frequencies;
   perform an inverse Fourier transformation of the detection signal in order to generate a propagation time spectrum;
   evaluate the propagation time spectrum in order to ascertain at least one distance between the laser distance meter and at least one of the target objects; and
   evaluate the propagation time spectrum with regard to phase values in order to carry out refined distance determination and to determine a zero crossing of the phase values.

2. The laser distance meter as claimed in claim 1, wherein a plurality of distances between the laser distance meter and each of a plurality of the target objects are ascertained when evaluating the propagation time spectrum in order to measure multi-target distances.

3. The laser distance meter as claimed in claim 1, wherein the modulation frequencies are equidistantly spaced.

4. The laser distance meter as claimed in claim 1, wherein a digital filtering is carried out with regard to the detection signals.

5. The laser distance meter as claimed in claim 1, wherein coarse distance determination is carried out by evaluating the propagation time spectrum with regard to amplitude values.

6. The laser distance meter as claimed in claim 1, wherein the zero crossing of the phase values is determined at points of the propagation time spectrum at which the amplitude values lie in the form of a peak significantly above a noise amplitude.

7. The laser distance meter as claimed in claim 6, wherein adjacent support points of the phase values are developed with knowledge of a phase gradient over a propagation time.

8. The laser distance meter as claimed in claim 1, wherein the light detector comprises at least one SPAD or an array of SPADs.

9. A method for operating a laser distance meter, wherein the laser distance meter includes:
   a laser light source configured to emit a temporally modulated laser light toward target objects;
   a light detector configured to detect a reflected laser light reflected by target objects, wherein the light detector is designed to directly synchronously sample the reflected laser light modulated with frequencies in the range of 10 MHz to 5 GHz; and
   an electronic control and analyzing unit configured to control the laser light source and analyze signals of the light detector;
   wherein the method comprises:
   driving the laser light source in order to emit the temporally modulated laser light successively at a multiplicity of at least 20 discretely different modulation frequencies;
   detecting the reflected laser light reflected by target objects by directly synchronously sampling over a measurement time duration and generating a detection signal for each of the modulation frequencies;
   performing an inverse Fourier transformation of the detection signal in order to generate a propagation time spectrum;
   evaluating the propagation time spectrum in order to ascertain at least one distance between the laser distance meter and at least one of the target objects and
   evaluating the propagation time spectrum with regard to phase values in order to carry out refined distance determination and to determine a zero crossing of the phase values.

10. A computer program product containing machine-readable instructions configured to drive a programmable laser distance meter to carry out the method as claimed in claim 9.

11. A non-transitory computer-readable medium including the computer program product as claimed in claim 10 stored thereon.

12. The laser distance meter as claimed in claim 1, wherein the light detector is designed to directly synchronously sample the reflected laser light modulated with frequencies in the range of 100 MHz to 1.5 GHz.

13. The laser distance meter as claimed in claim 1, wherein the electronic control and analyzing unit is designed to drive the laser light source in order to emit the temporally modulated laser light successively at a multiplicity M of at least 100 discretely different modulation frequencies.

14. The method for operating a laser distance meter as claimed in claim 9, wherein the light detector is designed to directly synchronously sample the reflected laser light modulated with frequencies in the range of 100 MHz to 1.5 GHz.

15. The method for operating a laser distance meter as claimed in claim 9, further comprising driving the laser light source in order to emit the temporally modulated laser light successively at a multiplicity M of at least 100 discretely different modulation frequencies.

* * * * *